March 20, 1934.  R. B. SMITH  1,951,885
ART OF RECOVERING HYDROCARBONS
Filed Oct. 26, 1931
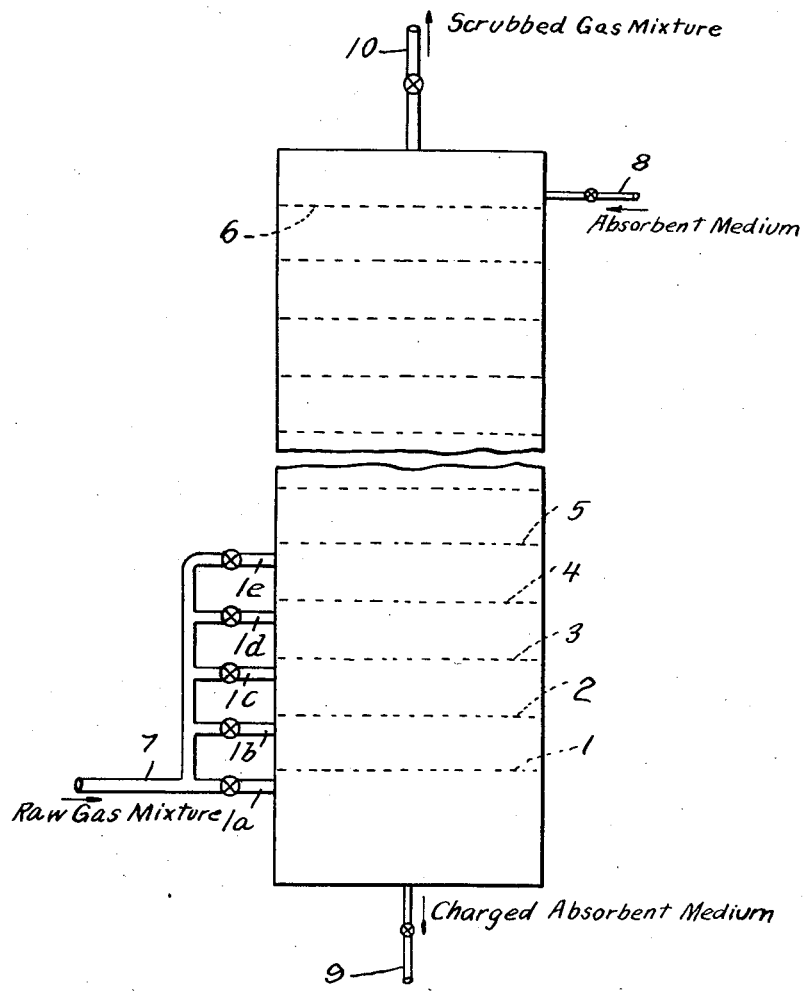
INVENTOR
Reading B. Smith
BY
Pennie, Davis, Marvin & Edmonds
ATTORNEYS Patented Mar. 20, 1934

1,951,885

UNITED STATES PATENT OFFICE 1,951,885

ART OF RECOVERING HYDROCARBONS

Reading Barlow Smith, Whiting, Ind., assignor to Sinclair Refining Company, New York, N. Y., a corporation of Maine Application October 26, 1931, Serial No. 571,107

1 Claim. (Cl. 183—114.6)

This invention relates to improvements in the scrubbing of hydrocarbon gas mixtures including a series of condensible hydrocarbon constituents of progressively larger molecular weights, butane, pentane and hexane for example, to recover such condensible constituents from the gas mixture.

In conventional practice, an absorbent medium, frequently a hydrocarbon oil higher boiling than the hydrocarbon constituents to be recovered from the gas mixture, is passed in countercurrent to the gas mixture through a series of zones, so called "bubble trays" in a tower for example, in each of which the absorbent medium and the gas mixture are brought into intimate contact, the raw gas mixture being introduced into the zone through which the absorbent medium last passes and the scrubbed gas mixture being discharged from the zone through which the absorbent medium first passes.

As the gas mixture passes through successive zones, in such practice, the concentration of constituents of larger molecular weight, pentane for example, decreases and that of constituents of smaller molecular weight, propane for example, increases. Constituents of smaller molecular weight are absorbed by the absorbent medium passing in countercurrent to the gas mixture in the zones through which the gas mixture last passes but are again displaced from the absorbent medium by constituents of larger molecular weight in the zones through which the gas mixture first passes. The increase in concentration of constituents of smaller molecular weight and the decrease in concentration of constituents of larger molecular weight in the gas mixture in the zone through which it first passes, and thereafter in the successive zones, is brought about by at least two factors, absorption of constituents of larger molecular weight and displacement of previously absorbed constituents of smaller molecular weight.

The absorbent medium leaving the zone through which it last passes approaches equilibrium with the gas mixture leaving that zone, a gas mixture containing constituents of larger molecular weight in concentration smaller than the concentration of these same constituents in the raw gas mixture, instead of approaching equilibrium with the raw gas mixture. As a result, the absorbent medium is saturated with respect to the gas mixture leaving this zone but not with respect to the raw gas mixture entering this zone. In such conventional practice, it follows that the absorptive capacity of the absorbent medium is never wholly utilized. This has been recognized by the use of a so called "saturation factor" to bring calculations based on theoretical considerations, with respect to design for example, into alignment with the observed facts.

In accordance with the present invention, the gas mixture leaving the first zone and entering the second zone, for example, is enriched with constituents of larger molecular weight to bring the absorbent medium leaving the zone through which it last passes into equilibrium with a gas mixture approximating the raw gas mixture in composition, or in other words into approximate equilibrium with the raw gas mixture. A number of important advantages are thus secured. In one aspect the invention increases the effective capacity of the absorbent medium to an extent such that the same net recovery from the same raw gas mixture passing through the scrubbing operation at the same rate can be accomplished with the same absorbent medium circulating through the scrubbing operation at a rate decreased as much as 20% or more. In another aspect, the invention makes it possible to accomplish the same net recovery with the same or a reduced rate of circulation of the absorbent medium with a reduced number of zones in contact. These advantages are reflected in reduced operating costs and in reduced equipment costs.

In accordance with the present invention, an absorbent medium is passed in countercurrent to the gas mixture through a series of zones in each of which the absorbent medium and the gas mixture are brought into intimate contact, the scrubbed gas mixture is discharged from the zone through which the absorbent medium first passes, the raw gas mixture is divided into two or more streams, one of these streams is introduced into the zone through which the absorbent medium last passes, another of the streams is introduced into one of the preceding zones and other streams may be introduced into other preceding zones.

The invention will be further described in connection with the accompanying drawing which illustrates, diagrammatically and conventionally, one form of apparatus adapted for the practice of the invention. It will be understood that the invention can be practiced in other and different forms of apparatus.

The accompanying drawing illustrates a scrubbing tower conventional except for the provision of a manifolded group of connections 1a, 1b, 1c, 1d and 1e between the connection 7 through which the raw gas mixture is supplied and the five zones of contact through which the absorbent medium last passes, 1, 2, 3, 4 and 5 respectively.

The zones of contact, the five just mentioned, the zone through which the absorbent medium first passes 6, and the intermediate zones, may consist of conventional so called "bubble trays". The absorbent medium is supplied through connection 8. The absorbent medium charged with absorbed constituents is discharged through connection 9. The scrubbed gas mixture is discharged through connection 10.

In carrying out the invention in the scrubbing tower illustrated, instead of supplying all of the raw gas mixture supplied to the tower through a single connection corresponding to connection 1a, a part of the raw gas mixture is supplied through connection 1a, another part is supplied through connection 1b, and other parts may be supplied through one or more of the connections 1c, 1d and 1e. For example, 40% of the raw gas mixture may be supplied through connection 1a and 60% through connection 1b. Again for example, 40% of the raw gas mixture may be supplied through connection 1a, 40% through connection 1b and 20% through connection 1c. The concentration of constituents of larger molecular weight in the gas mixture leaving the zone of contact 1 and entering the zone of contact 2 is thus increased by the addition of part of the raw gas mixture through connection 1b. By thus adjusting the composition of the gas mixture leaving the zone through which the absorbent medium last passes more closely to correspond to the composition of the raw gas mixture, the absorbent medium leaving the zone through which it last passes is brought into equilibrium with a gas mixture approximating the raw gas mixture in composition, or in other words into approximate equilibrium with the raw gas mixture. By adjusting the composition of the gas mixture leaving the preceding zone in a similar manner, and so on, equilibrium with the raw gas mixture can be approximated within substantially any chosen limit.

I claim:

In scrubbing hydrocarbon gas mixtures including a series of condensable hydrocarbon constituents of progressively larger molecular weights, the improvement which comprises passing an absorbent medium countercurrent to the gas mixture through a series of zones in each of which the absorbent medium and the gas mixture are brought into intimate contact, discharging the scrubbed gas mixture from the zone through which the absorbent medium first passes, dividing the raw gas mixture into a plurality of streams and introducing said streams into the zone through which the absorbent medium last passes and at least one of the preceding zones, thereby to bring the absorbent medium containing absorbed condensable hydrocarbons leaving the zone through which the absorbent medium last passes into approximate equilibrium with the raw gas mixture.

READING BARLOW SMITH.